United States Patent [19]

Miyakawa et al.

[11] Patent Number: 5,459,363
[45] Date of Patent: Oct. 17, 1995

[54] ROTOR FOR DYNAMO ELECTRIC MACHINE

[75] Inventors: Kado Miyakawa; Takanobu Mori; Yasuomi Yagi; Fumio Shibata, all of Hitachi, Japan

[73] Assignee: Hitachi, Ltd., Tokyo, Japan

[21] Appl. No.: 326,333

[22] Filed: Oct. 20, 1994

[30]   Foreign Application Priority Data

Nov. 5, 1993   [JP]   Japan .................................. 5-276446

[51] Int. Cl.$^6$ ............................ H02K 3/487; H02K 1/22
[52] U.S. Cl. ............................................. 310/214; 310/261
[58] Field of Search ...................................... 310/214, 261

[56]         References Cited

U.S. PATENT DOCUMENTS

| | | | |
|---|---|---|---|
| 4,594,221 | 6/1986 | Caron et al. | 420/485 |
| 4,843,271 | 6/1989 | Shah | 310/261 |
| 4,876,469 | 10/1989 | Khutoretsky et al. | 310/214 |
| 5,030,871 | 7/1991 | Shah et al. | 310/261 |
| 5,252,877 | 10/1993 | Sawa et al. | 310/214 |

FOREIGN PATENT DOCUMENTS

| | | |
|---|---|---|
| 56-055541 | 5/1981 | Japan . |
| 59-35420 | 8/1984 | Japan . |
| 61-235525 | 10/1986 | Japan . |
| 63-12931 | 3/1988 | Japan . |
| 64000240 | 1/1989 | Japan . |
| 3140429 | 6/1991 | Japan . |
| 5077061 | 3/1993 | Japan . |
| 5-276706 | 10/1993 | Japan .................................. 310/214 |

OTHER PUBLICATIONS

N. Takahashi et al., "Improvement of Unbalanced Current Capability of Large Turbine Generators," in IEEE Transactions on Power Apparatus and System, vol. PAS-94, No. 4, Jul./Aug. 1975, pp. 1390–1397.

*Primary Examiner*—Clayton E. LaBalle
*Attorney, Agent, or Firm*—Fay, Sharpe, Beall, Fagan, Minnich & McKee

[57]         ABSTRACT

The rotor for a dynamo electric machine serving as a synchronous generator as well as being designed operable as a variable speed motor for starting a prime mover for the synchronous generator, the rotor (1) comprising a rotor core (2), a plurality of slots (4) disposed around the circumference of the rotor core (2) and extending along the axial direction of the rotor core (2), rotor windings (3) being accommodated in the slots (4) and wedges (6) being accommodated in the slots (4) over the rotor windings (3) near at the surface of the rotor core (2) for preventing the rotor windings (3) from being pushed out due to a centrifugal force caused by rotation of the rotor (1), wherein wedges (6) where an eddy current flows are formed by Cu-0.05~4 wt % Zr-0.3~5 wt % Ni-0.2~1.5 wt % Si having a 0.2% proof stress equal to or more than about 20 Kg/mm$^2$ and an electrical conductivity equal to or more than about 20% IACS (International Annealed Copper Standard), whereby damages of the rotor elements due to electrolytic corrosion are prevented.

6 Claims, 7 Drawing Sheets

DURING UPWARD

DURING DOWNWARD

Cu-Zr-Ni-Si ALLOY

Cu-Ni-Si ALLOY

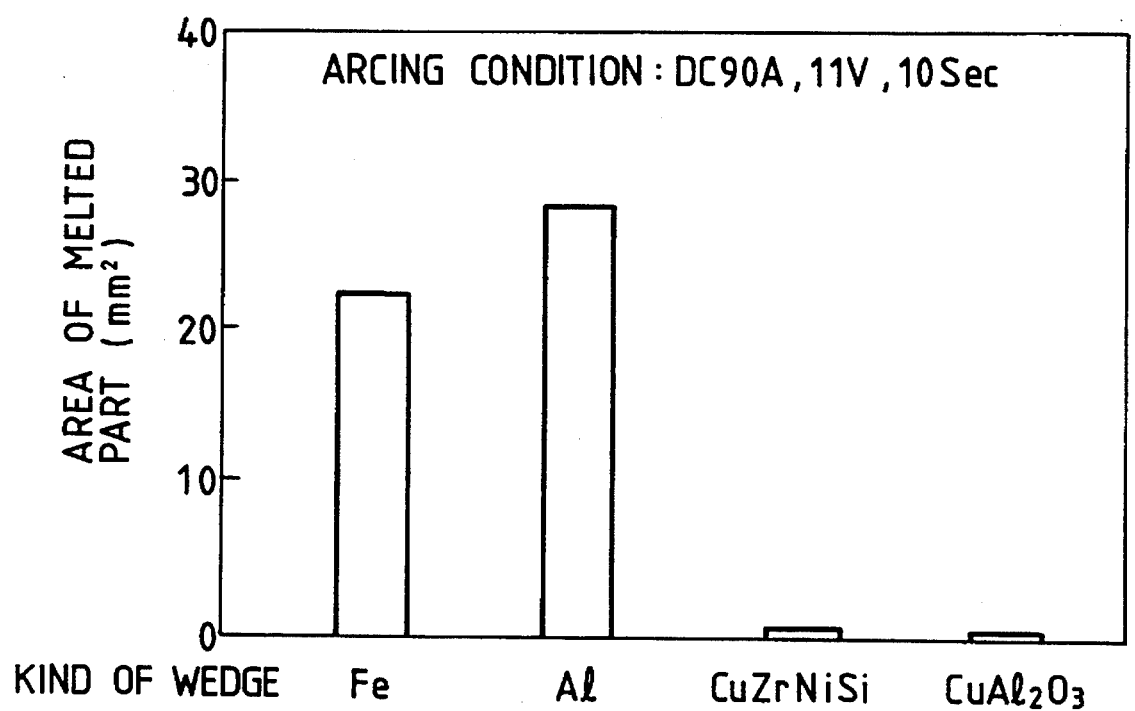

ROTOR FOR DYNAMO ELECTRIC MACHINE

BACKGROUND OF THE INVENTION

1. Field of Industrial Application

The present invention relates to a rotor for a dynamo electric machine in which materials for portions on the rotor such as wedges where an eddy current flows are improved.

2. Conventional Art

Iron or aluminum alloy is generally used for wedges which press field windings of a rotor for an electric generator used in an electric power generating plant using a gas turbine or a steam turbine as its prime mover.

In response to increasing electric power demands large capacity electric power generation plants are these days being constructed. In association therewith likely large starting devices are necessitated which are designed to start gas turbine or combined cycle power generation plants and a thyristor type starting system has been drawing an attention, in which during starting a power generation plant a synchronous generator in the power generation plant is operated as a variable speed motor and a gas turbine in the electric power genetation plant is accelerated upto a predetermined speed from where a self speed up is possible by a torque generated by the variable speed motor.

A rotating speed of a synchronous motor varies depending on frequencies of an AC power source applied to the armature windings thereof. Therefore, an AC power source of variable frequency is necessitated for operating a synchronous generator in variable speed, and the frequency thereof has to be adapted to be controlled dependent on the rotating speed of the variable speed motor. For the purpose of obtaining such AC power source of variable frequency a frequency converter device using semiconductor elements such as thyristors is made use of.

A frequency converter device is composed by a forward converting unit in which an AC is converted into a DC and a backward converting unit in which a DC is converted into an AC. When starting an electric power generation plant by making use of such frequency converter device, a rectangular shaped current is flowed through the armature windings of the electric generator. The rectangular shaped current contains higher harmonic current components as expressed by the following equations;

Frequencies of higher harmonic waves: $f_i = (6i \pm 1) f_0$

Magnitudes of higher harmonic waves: $A_i = A_0 / (6i \pm 1)$ wherein, i=1, 2, 3, ...

$f_0$=frequency of fundamental wave $A_0$=magnitude of fundamental wave

The higher harmonic current components flowing through the armature windings induce eddy currents on the surface of the rotor. Eddy current flowing through a wedge moves to teeth portions at a joint between adjacent wedges while bypassing the same. Further, eddy current moves to a retaining ring and a damper ring at the ends of the rotor and flows into the circumferential direction. Still further, at the magnetic poles eddy current flows in concentration near at the ends of cross slots because of restricted current flow passages. Due to these eddy currents flowing through the surfaces of the rotor resistance loss is generated to thereby raise the surface temperature of the rotor.

On one hand, a cooling performance of the rotor depends on its rpm, and when rotating in a low speed at the time of starting, the rotor shows an insufficient cooling performance to thereby raise a problem of increasing the rotor surface temperature during starting which causes an adverse effect to the electric generator. Further, since an electric power transmission system contains higher harmonic current components generated by many kinds of electric machines and apparatus included therein, an electric generator is always placed in a condition to be subjected to the higher harmonic current components.

In order to prevent an eddy current flowing through the surfaces of the rotor, it is conceived to concentrate the eddy current into wedges pressing the field windings in the rotor of the electric generator as well as into damper windings. However, when the wedges are made of one common material of iron, the resistivity thereof is substantially the same as that of the rotor such that it is difficult to concentrate the eddy current into the wedges. Likely, when the wedges are made of another common material of aluminum, the eddy current can be concentrated into the wedges, however such wedges raise another problem of poor resistance to electrolytic corrosion which is likely caused during such as at a low speed rotation.

JP-B-59-35420(1984) discloses wedges made of a Cu alloy containing Si and Ni of a few wt %, but pays no attention to electrolytic corrosion. JP-B-63-12931(1988) discloses a high mechanical strength and high electrical conductivity Cu alloy containing Si, Ni and Zr of a few wt % for electric machines, but again pays no attention to electrolytic corrosion as well as application to wedges and the like.

Further, it will cause a problem if a large current is flowed through the damper windings which are generally made of copper because of a relatively low heat resistance of the copper.

SUMMARY OF THE INVENTION

An object of the present invention is to provide a rotor for a dynamo electric machine which prevents dameges due to electrolytic corrosion.

For resolving the above problem, in the rotor for a dynamo electric machine according to the present invention, a plurality of slots disposed around the circumference of a rotor core and extending in the axial direction thereof are provided, rotor windings are accommodated in the slots as well as wedges for preventing the rotor windings constituting field windings from being pushed out due to centrifugal force caused by rotation of the rotor are also accommodated in the slots near at the surface of the rotor, wherein the wedges are, for example, made of an alloy of Cu, Zr, Ni and Si.

When an alloy of Cu, Zr, Ni and Si is, for example, used for the wedges, since the Cu alloy shows a desirable electrical conductivity which lowers the electric resistance of the wedges and limits the temperature rise thereof to thereby suppress the surface temperature rise of the rotor as well as shows a high mechanical strength and an excellent electrolytic corrosion resistance which limits deformation of the wedges by sparking, for example, when the wedges collide to the teeth of the rotor core and further prevents damages of the wedges.

BRIEF DESCRIPTION OF THE DRAWINGS

FIG. 8 is a characteristic diagram illustrating electrolytic corrosion resistance of the alloys according to the present invention and conventional metals;

DETAILED DESCRIPTION OF THE EMBODIMENTS

Figure 1:
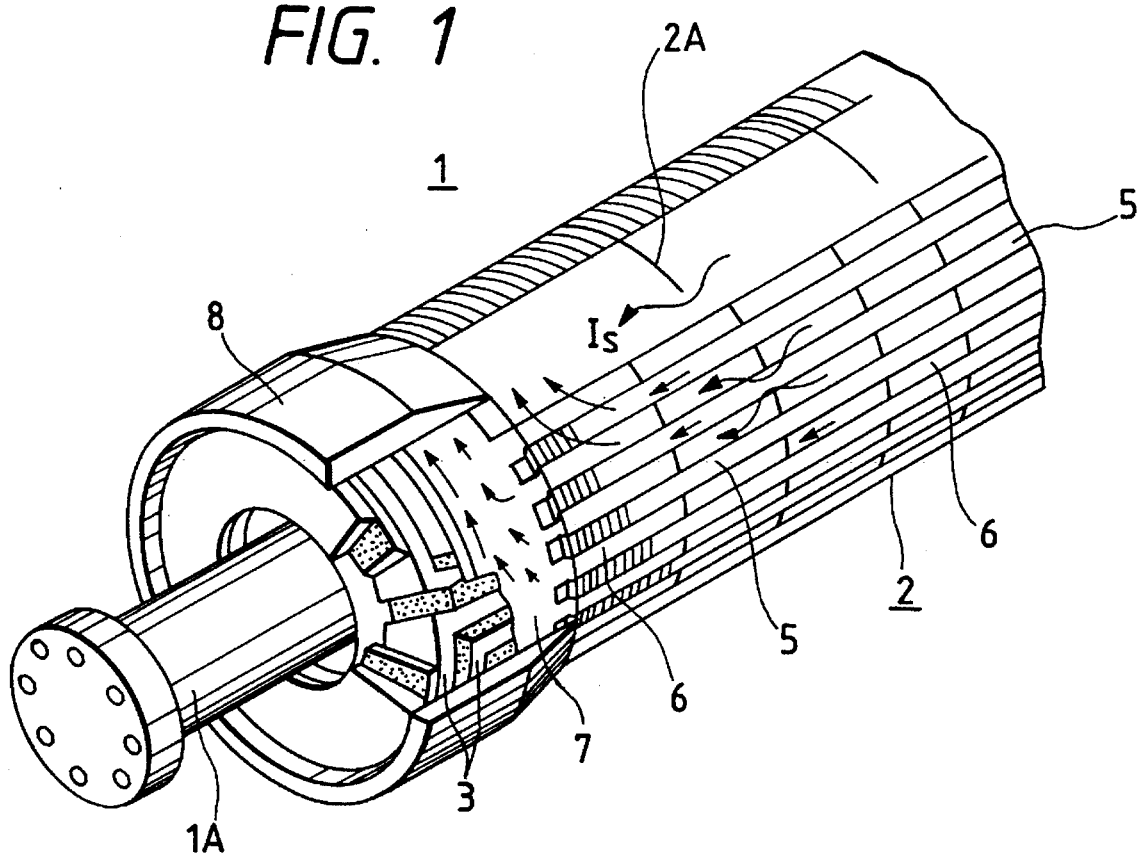
FIG. 1 is a perspective view of an embodiment of rotors for an electrical generator according to the present invention.
Figure 2:
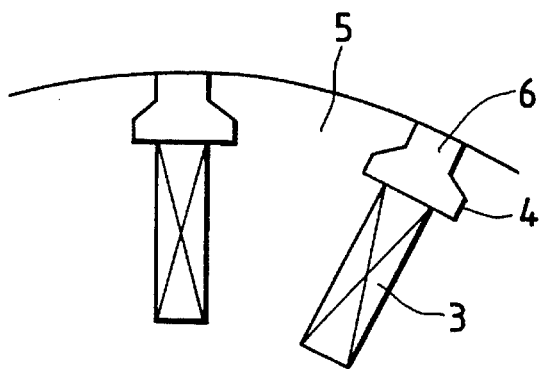
FIG. 2 is a partial cross sectional view of the rotor in FIG. 1.
Figure 3A:
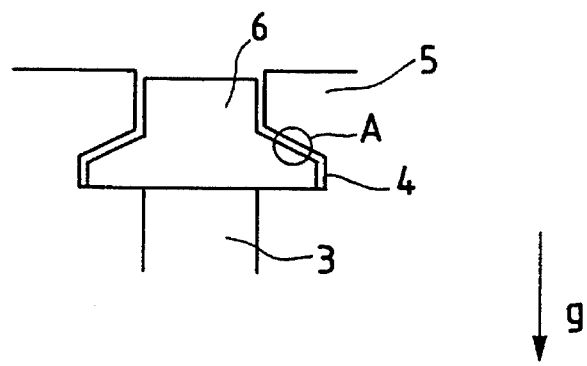
FIG. 3A and FIG. 3B are partial cross sectioal views when a particular slot accommodating a wedge of the rotor in FIG. 1 is at the top position and when the particular slot is at the bottom position.
Figure 3B:
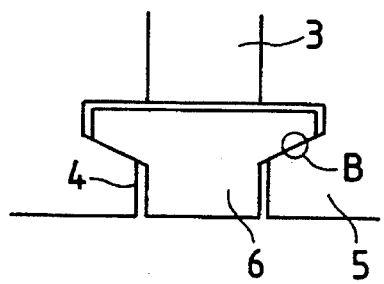

Hereinbelow, embodiments of the present invention are explained with reference to FIG. 1 through FIG. 3B. FIG. 1 shows a rotor 1 for a synchronous generator, and FIG. 2, FIG. 3A and FIG. 3B show respectively partial cross sectional views of the rotor 1.

The rotor 1 is formed in a cylindrical shape, provided with main shafts 1A at both ends thereof and is constituted principally by an iron core 2 and field windings 3. A plurality of vertical slots 4 and teeth 5 are disposed around the circumference of the rotor 1 and extend in the axial direction thereof. The field windings 3 and wedges 6 are accommodated within the vertical slots 4. The wedges 6 are disposed in the vertical slots 4 at the outer circumferential side of the field windings 3, are divided into a plurality of sections along the axial direction and prevent the field windings 3 from being pushed out from the vertical slots 4. Damper rings 7 are connected to the wedge ends at the main shaft sides and are mounted around the circumference of the rotor 1, and retaining rings 8 are disposed on the upper sides of the damper rings 7. The retaining rings 8 secure the field windings 3, the damper rings 7 and the like to the rotor 1. Numeral 2A indicates a cross slots formed on magnetic pole portions on the rotor 1.

The rated rpm of the rotor 1 of the electric generator according to the present embodiment is about 3600 rpm, however, during starting time the rotor rotates at a low rotating speed, for example, below about 100 rpm. Therefore, from one aspect the wedges 6 are required to have a predetermined mechanical strength to withstand a high centrifugal force acting on the wedges 6 of the rotor 1 during the rated rpm operation. From another aspect, the wedges 6 are required to have a high electric conductivity in comparison with that of the rotor surface so as to concentrate the eddy current induced in the rotor into the wedges 6.

Figure 4:
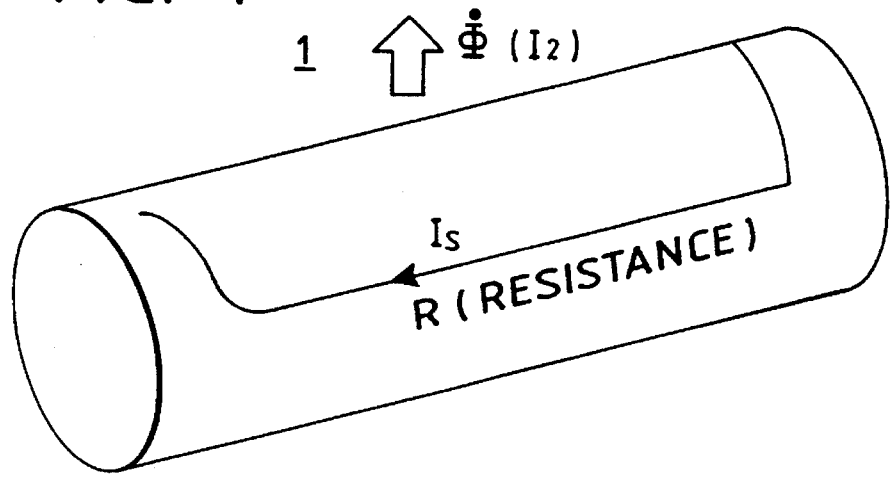
FIG. 4 is a view for explaining an induced eddy current flowing on the surface of the rotor in FIG. 1.

FIG. 4 shows a schematic illustration of an eddy current induced on the rotor 1 for explaining the temperature rise thereby. The eddy current is induced on the rotor 1 proportionates to a higher harmonic current $I_2$ flowing through the armature windings. Namely, the relationship between both currents is represented by $I_s \propto I_2$.

On the other hand, a relationship between temperature rise $\Delta T$ of the rotor surface and eddy current $I_s$ is represented by the following formula;

$$\Delta T \propto R \cdot I_s^2$$

wherein, R: the resistance of the rotor surface where the eddy current flows.

Accordingly, the temperature rise of the rotor surface proportionates to the resistance of the rotor surface where the eddy current flows. In other words, when the resistance of the rotor surface where the eddy current flows is reduced, the temperature rise of the rotor surface is suppressed.

In view of the above and through experimental study, the inventors acertained that the following conditions with regard to the mechanical strength and electric conductivity satisfy requirements for wedges for a rotor of an electric generator which is to be used as a variable speed motor;

0.2% proof stress ≧ about 20 Kg/mm²     (1)

electric conductivity ≧ about 20% IACS     (2)

wherein, IACS: International Annealed Copper Standard (ρ(20° C.)=1.7241 μΩcm)

The mechanical strength and electric conductivity of the wedges 6 are explained with reference to experimental data as illustrated in FIG. 5A through FIG. 8.

FIGS. 5A through 5F show characteristic diagrams of mechanical strength and electric conductivity of Cu-Zr-Ni-Si series alloys according to the present embodiment.

Figures 5A, 5B, 5C:
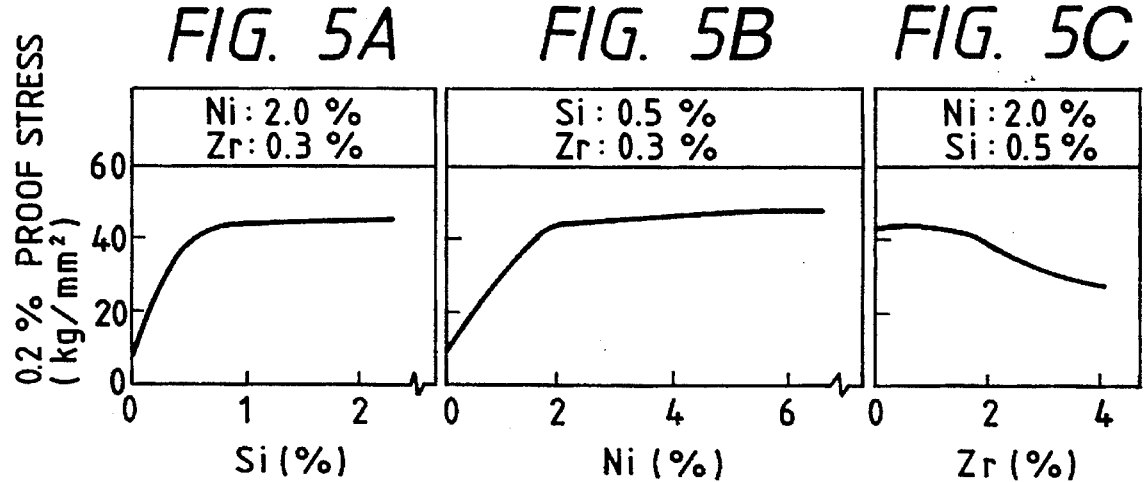
FIG. 5A through FIG. 5F are characteristic diagrams with regard to mechanical strength and electrical conductivity of the Cu-Ni-Si-Zr alloy used for the wedges of the rotor as illustrated in FIG. 1.
Figures 5D, 5E, 5F:
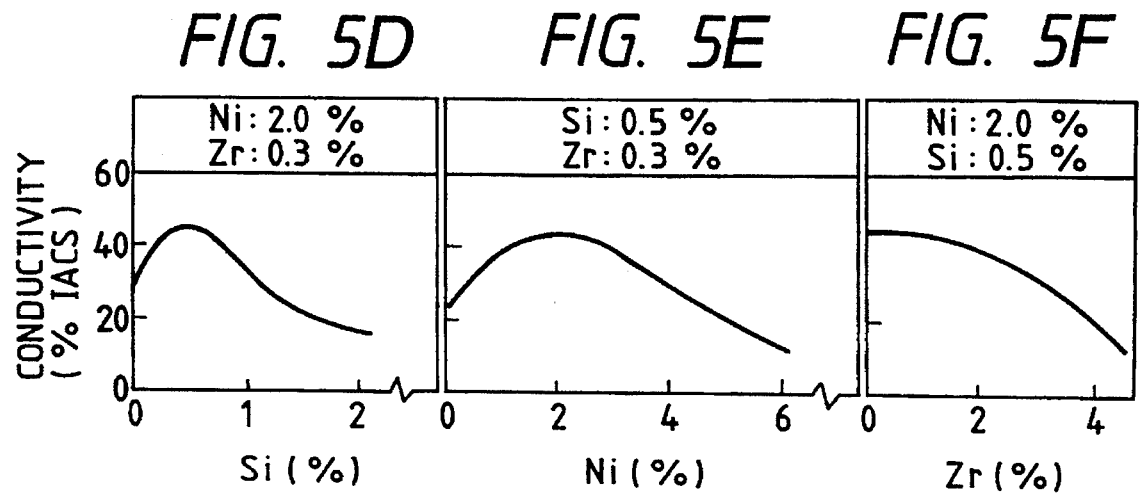

As illustrated in FIG. 5A, with regard to Si in the composition of the Cu-Zr-Ni-Si series alloys more than 0.2 wt % Si is required for fulfilling the above inequity formula (1). However, as seen from FIG. 5D when the amount of Si exceeds over 1.5 wt %, the electric conductivity of the alloy reduces below one defined by the above inequity formula (2). Accordingly, an amount of Si of 0.2~1.5 wt % is preferable in the alloy composition.

With regard to Ni in the alloy composition as illustrated in FIG. 5B, more than 0.3 wt % Ni is required for fulfilling the above inequity formula (1). However, as seen from FIG. 5E when the amount of Ni exceeds over 5 wt %, the electric conductivity of the alloy reduces below one defined by the above inequity formula (2). Accordingly, an amount of Ni of 0.3~5 wt % is preferable in the alloy composition.

Figure 6:
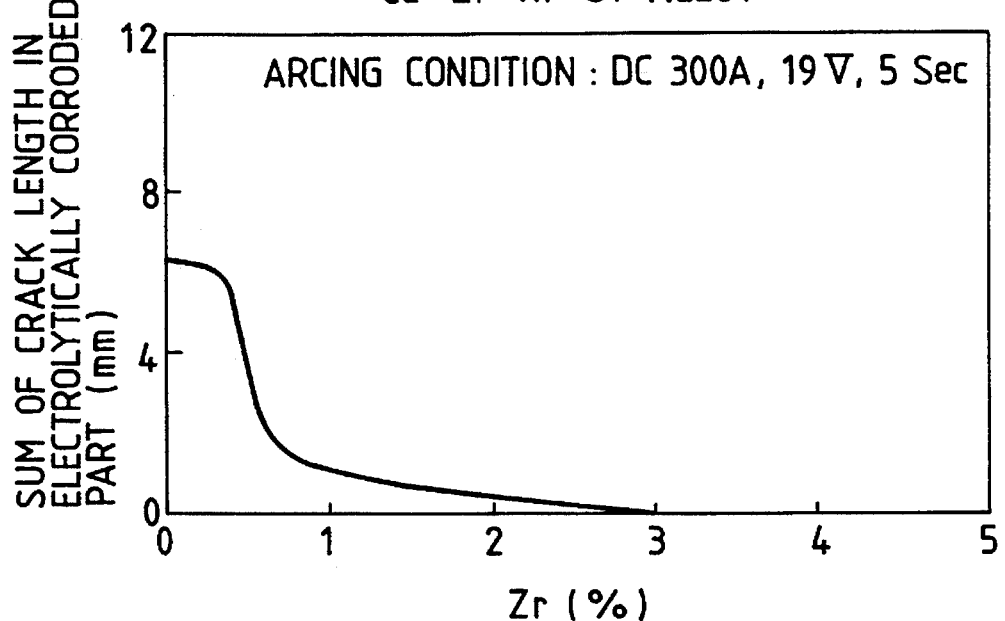
FIG. 6 is a characteristic diagram illustrating electrolytic corrosion resistance of the Cu-Ni-Si-Zr alloy in FIG. 5 depending on the amount of Zr contained in the alloy composition.

With regard to Zr in the alloy composition as illustrated in FIG. 6, more than 0.05 wt % Zr is required for suppressing cracking due to electrolytic corrosion. However, when the amount of Zr exceeds over 4 wt %, the electric conductivity of the alloy reduces below one defined by the above inequity formula (2). Accordingly, an amount of Zr of 0.05~4 wt % is preferable in the alloy composition.

Figure 7:
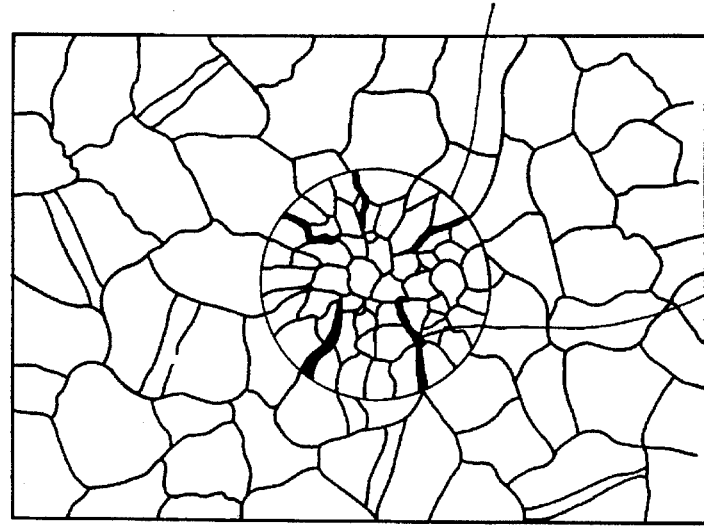
FIG. 7 is a crystalline diagram of the Cu-Ni-Si alloy as illustrated in FIG. 5.

A Cu-Ni-Si alloy not containing Zr is likely to be suffered from cracking at electrolytically corroded portions as illustrated in FIG. 7. However, when 0.05~4 wt % Zr is added to Cu-0.2~1.5 wt % Si-0.3~5 wt % Ni alloy composition according to the present embodiment, the cracking at the electrolytically corroded portions is limited.

Now, a performance when the Cu-0.2~1.5 wt % Si-0.3~5 wt % Ni-0.05~4 wt % Zr alloy according to the present embodiment is used for the wedges 6 is explained.

Since the wedges 6 are divided into a plurality of sections along the axial direction, a current component flowing through the wedges 6 of the eddy current flowing through the rotor surface bypasses toward the teeth portion 5 at the sectioned portions of the wedges 6. As a result, local surface temperature rise of the rotor 1 may be caused due to the electrical resistance of the contacting faces between the wedges 6 and the teeth 5, an arcing therebetween may be caused due to a potential difference between the contacting faces or the contacting portions between the wedges 6 and the teeth 5 may be melted due to electrolytic corrosion.

In particular, when the rotor 1 is rotating at a low rotating speed, for example, during an initial stage of the thyristor type starting, a centrifugal force acting on the wedges 6 is low, therefore when a slot in the rotor 1 occupies a top position as illustrated in FIG. 3A, the wedge 6 is separated from the teeth 5 via a gap in the vertical slot 4 as indicated by encircled portion A and an arcing between the wedge 6 and the teeth 5 can be induced. Further, when the particular slot in the rotor 1 occupies a bottom position after a half rotation as illustrated in FIG. 3B the wedge 6 impacts to the teeth 5 due to gravity g as indicated by encircled portion B.

However, since the wedges 6 according to the present embodiment uses the above explained Cu-Zr-Ni-Si alloy having a high mechanical strength, a desirable electric conductivity and an excellent electrolytic corrosion resistance, the temperature rise of the rotor surface is limited even when an eddy current flows therethrough, the deformation of the wedge 6 is limited even when the wedge 6 impacts against the teeth 5 as well as the wedge 6 is hardly damaged by melting even when arcing are caused.

Further, when 0.05~4 wt % Zr is added to Cu-0.2~ 1.5 wt % Si-0.3~5 wt % Ni alloy composition according to the present embodiment, the cracking at the electrolytically corroded portions is extremely limited such that damaging of the wedges 6 by melting is limited accordingly.

FIG. 8 shows a comparison of electrolytic corrosion resistance between the wedges according to the present embodiments and conventional wedges. With regard to electrolytic corrosion resistance the Cu alloy wedges according to the present embodiments exhibit a resistance of about 50 times in comparison with the conventional wedges made of such as iron and aluminum.

Further, because of an electric resistance of the contacting faces of the teeth 5 and the wedges 6 the temperature of the rotor 1 rises locally. However, since the Cu alloy wedges according to the present embodiment show a high mechanical strength and a good electrical conductivity as seen from the mechanical strength and electrical conductivity characteristics as illustrated in FIGS. 5A and 5B, the electrical resistance is lowered such that the temperature rise is suppressed and the deformations of the wedges 6 when the wedges 6 impact against the teeth 7 are limited and the damages of the wedges 6 are prevented, thereby the pushing out of the field windings 3 from the vertical slots is also prevented.

Figure 9A:
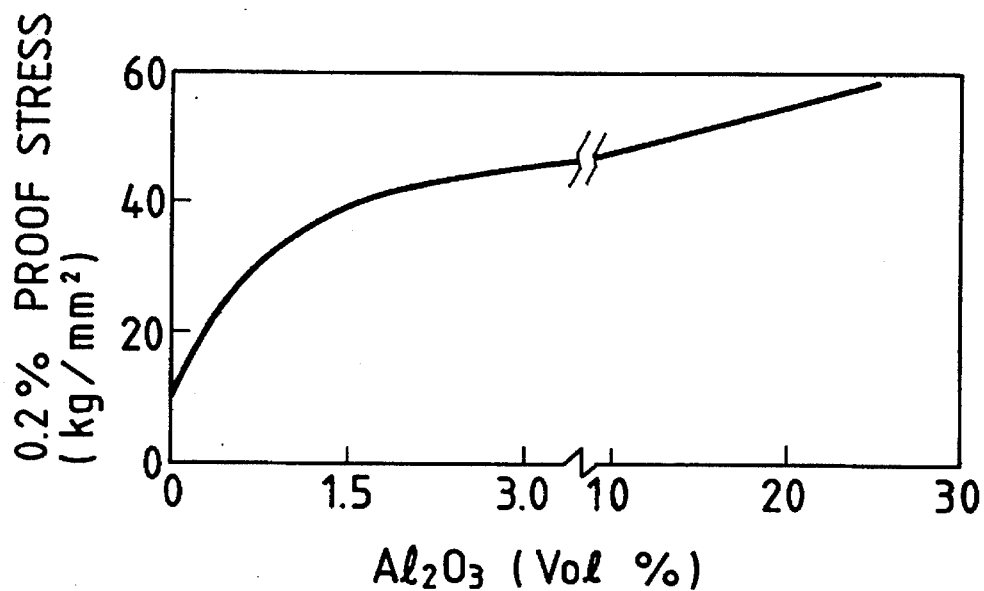
FIG. 9A and FIG. 9B are characteristic diagrams illustrating mechanical strength and electrical conductivity of $Cu-Al_2O_3$ alloy, another embodiment according to the present invention.
Figure 9B:
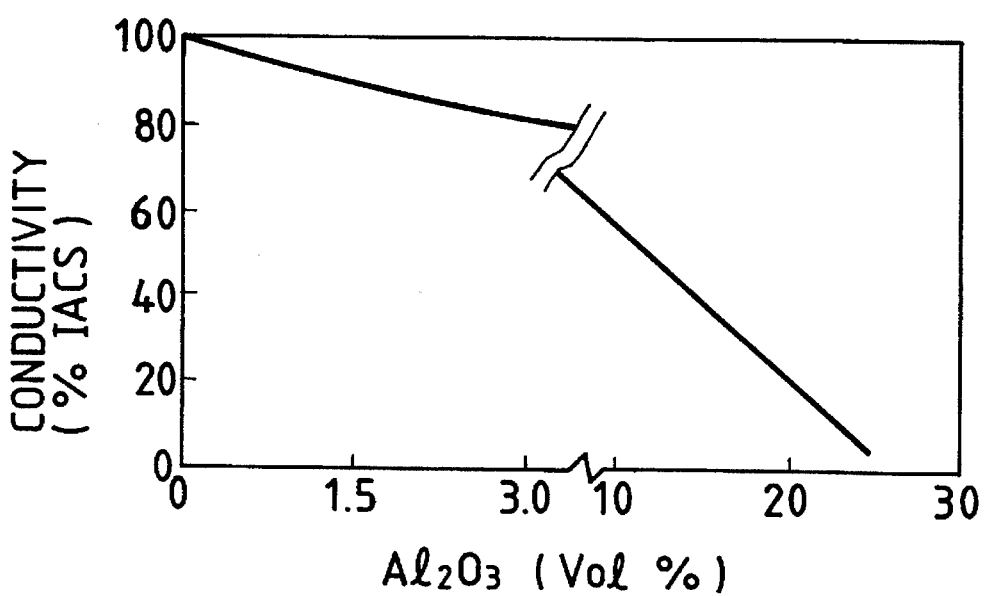

FIGS. 9A and 9B show mechanical strength and electrical conductivity of a Cu-$Al_2O_3$ alloy.

As seen from FIG. 9A, more than 0.3 vol % of $Al_2O_3$ is required in the Cu-$Al_2O_3$ alloy composition so as to fulfill the above inequity formula (1). However, when the amount of $Al_2O_3$ exceeds over 20 vol %, as seen from FIG. 9B the electrical conductivity of the Cu-$Al_2O_3$ alloy reduces below one required by the above inequity formula (2). Accordingly, amount of 0.3~20 vol % of $Al_2O_3$ in the Cu-$Al_2O_3$ alloy composition is preferable.

The electrolytic corrosion resistance of the Cu-$Al_2O_3$ alloy is better than those of other materials such as Fe and Al as seen from FIG. 8, such that when the Cu-$Al_2O_3$ alloy is used for the wedge material, substantially the same advantages obtained with the Cu-Zr-Ni-Si alloy wedges are achieved.

FIGS. 10A through 10F show mechanical strength and electrical conductivity characteristics of Cu-Al-Ni-Si alloy. In case of the Cu-Al-Ni-Si alloy when the alloy composition is properly selected, the alloys thereof exhibiting 0.2% proof stress of more than about 50 Kg/mm$^2$ and electrical conductivity of about 20% IACS can be obtained.

A preferable composition of Cu-Al-Ni-Si alloy is follows.

Figure 10A:
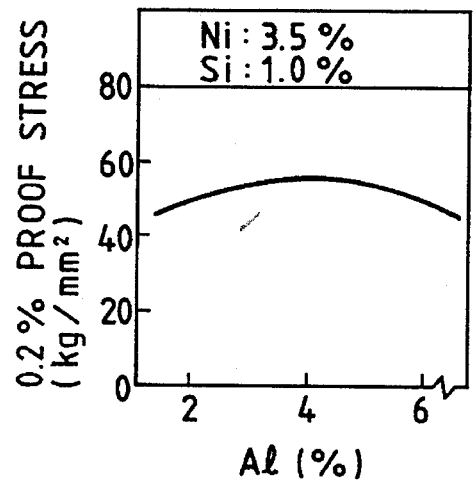
FIG. 10A through FIG. 10F are characteristic diagram illustrating mechanical strength and electrical conductivity of Cu-Al-Ni-Si alloy, still another embodiment according to the present invention.
Figure 10B:
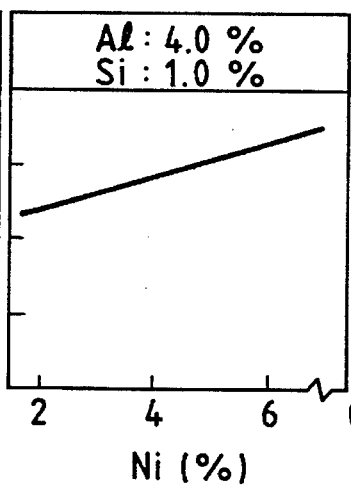
Figure 10C:
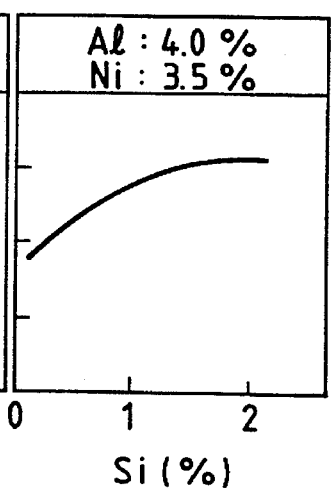
Figure 10D:
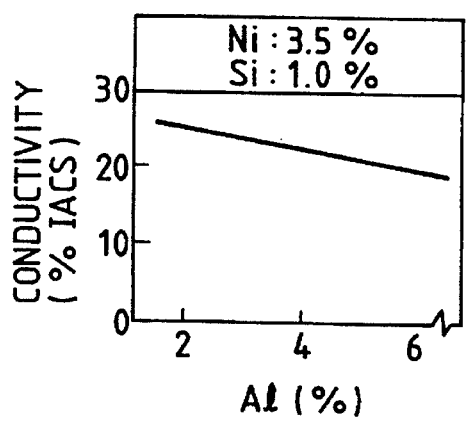
Figure 10E:
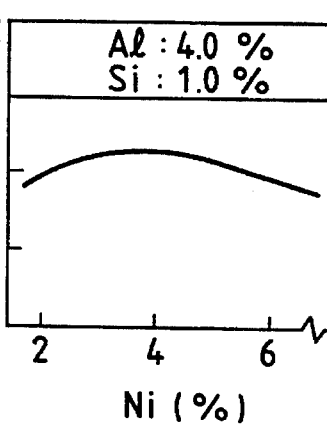
Figure 10F:
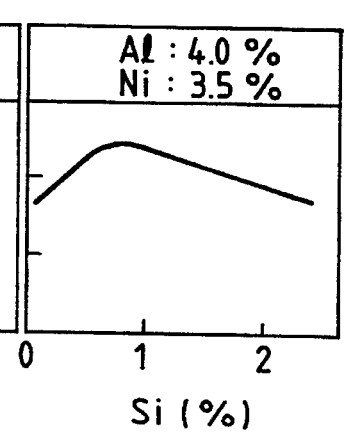

In order to obtain the 0.2% proof stress of more than 50 Kg/mm$^2$, an amount of Al of more than 2 wt % is required in the Cu-Al-Ni-Si alloy composition as seen from FIG. 10A. However, when the amount of Al exceeds over 6 wt % in the alloy composition, the electrical conductivity of the alloy composition reduces below one required by the above inequity formula (2). Accordingly, an amount of 2~6 wt % Al is preferable in the alloy composition.

In order to fulfill the electrical conductivity required by the above inequity formula (2), an amount of 2~6 wt % Ni is preferable in the Cu-Al-Ni-Si alloy composition.

Further, in order to fulfill the electrical conductivity required by the above inequity formula (2), an amount of 0.3~2 wt % Si is preferable in the Cu-Al-Ni-Si alloy.

When the Cu-2~6 wt % Al-2~6 wt % Ni-0.3~2 wt % Si alloy according to the present embodiment is used as the rotor wedges 6 for a dynamo electric machine, the above requirements for the wedges with regard to mechanical strength and electrical conductivity are fulfilled such that the temperature rise of the rotor surface caused by higher harmonic current components is suppressed and substantially the same advantages obtained with the above explained embodiments can be achieved.

Further, according to the present invention, the following alloys can be used as materials for the wedges and for the part of the rotor where the eddy current flows.

1) Cu-Ti-Ni alloy, Cu-Ni-Si alloy, Cu-Ti-Fe alloy, Cu-Ag alloy, Cu-Cr alloy, Cu-Zr-Cr-Al alloy, Cu-Ti-Si alloy and Cu-Co-Si alloy.

2) Cu alloys wherein ceramic microscopic particles of oxides, nitrides and the like such as $Al_2O_3$, $TiO_2$, $Y_2O_3$, BN and AlN are dispersed in Cu matrixes can be used as materials having good thermal resistance and suitable for the wedges and for the part of the rotor where the eddy current flows.

Further, when an eddy current Is flows on the surface of the rotor 1 as illustrated in FIG. 4 the temperature of the portion on the rotor 1 where the eddy current flows rises and a local temperature rise sometimes reaches upto several hundreds °C., therefore the thermal resistance of the wedges is one of important concerns. When wedges made of the above Cu alloy containing oxide or nitride ceramic particles are used, such wedges can fully withstand the above indicated temperature rise.

Further, the temperature rise at the end portions of the rotor during operation is significant in comparison with at the center thereof and still further the retaining rings are shrink-fitted at the both end portions during the manufacture of the rotor, therefore the end portions of the rotor has to be made by a material having an excellent thermal resistance.

On the other hand, it is preferable to use a material having a low electrical reaistance for the center portion of the rotor in order to suppress the temperature rise due to the eddy current.

For this reason, in one embodiment a Cu alloy having a high thermal resistance is used for the both end portions of the rotor and a Cu alloy having a high electrical conductivity is used for the center portion thereof.

Further, for a dynamo electric machine using conventional wedges can be modified simply by replacing the conventional wedges with the Cu alloy wedges according to the present embodiments having the same size to thereby improve the resistance to the higher harmonic current components.

In the above embodiments, the wedges are particularly referred to, however the Cu alloys according to the present embodiments can be applied to the portions of the damper rings where the eddy current flows.

According to the present invention, since Cu alloys having a good electrical conductivity, a high mechanical strength and an excellent electrolytic corrosion resistance are used for the wedges, damper rings and the like, the electrical resistance of the rotor surface is lowered and the temperature rise of the rotor surface is suppressed, damages of the portion where the eddy current flows are limited as well as the deformations of the wedges due to arcing caused when, for example, the wedges impact against teeth are also limited, thereby damages of the wedges and the like formed one of the Cu alloys according to the present invention is prevented.

We claim:

1. A rotor for a dynamo electric machine serving as a synchronous generator as well as being designed to be operable as a variable speed motor for starting a prime mover for the synchronous generator, said rotor (1) comprising a rotor core (2), a plurality of slots (4) disposed around the circumference of said rotor core (2) and extending along the axial direction of said motor core (2), rotor windings (3) being accommodated in said slots (4) and wedges (6) being accommodated in said slots over said rotor windings (3) near the surface of said rotor core (2) for preventing said rotor windings (3) from being pushed out due to a centrifugal force caused by rotation of said rotor (1), wherein at least one portion of said rotor core (2), where an eddy current flows, and wedges (6) are formed by a material having a 0.2% proof stress equal to or more than about 20 Kg/mm$^2$ and an electrical conductivity equal to or more than about 20% IACS (International Annealed Copper Standard) and having a higher electrolytic corrosion resistance than that of a Cu-Ni-Si alloy, and being a selected one from the group consisting of Cu-Zr-Ni-Si alloy, Cu-Al$_2$O$_3$ alloy, Cu-Al-Ni-Si alloy, Cu-Ti-Ni alloy, Cu-Ti-Fe alloy, Cu-Ag alloy, Cu-Cr alloy, Cu-Zr-Cr-Al alloy, Cu-Ti-Si alloy, Cu-Co-Si alloy and a Cu alloy wherein ceramic microscopic particles selected one from the group consisting of Al$_2$O$_3$, TiO$_2$, Y$_2$O$_3$, BN and AlN are dispersed in matrixes of Cu.

2. A rotor for a dynamo electric machine according to claim 1, wherein said Cu-Zr-Ni-Si alloy is composed of 0.2 to 1.5 wt % Si, 0.3 to 5 wt % Ni, 0.05 to 4 wt % Zr and remainder of Cu.

3. A rotor for a dynamo electric machine according to claim 1, wherein said Cu-Al$_2$O$_2$ alloy is composed of 0.3 to 20 vol % Al$_2$O$_2$ and remainder of Cu.

4. A rotor for a dynamo electric machine according to claim 1, wherein said Cu-Al-Ni-Si alloy is composed of 2 to 6 wt % Al, 2 to 6 wt % Ni, 0.3 to 2 wt % Si and remainder of Cu.

5. A rotor for a dynamo electric machine according to claim 1, wherein said wedge material is a Cu alloy wherein ceramic microscopic particles selected one from the group consisting of Al$_2$O$_3$, TiO$_2$, Y$_2$O$_3$, BN and AlN are dispersed in matrixes of Cu.

6. A rotor for a dynamo electric machine according to claim 1, wherein both axial end portions of said rotor core are formed by a Cu alloy having a high thermal resistance selected one from the group consisting of Cu-Zr-Ni-Si alloy and Cu-Ni-Ti alloy and the center portion of said rotor core is formed by another Cu alloy having a high electrical conductivity of Cu-Al$_2$O$_3$ alloy.

* * * * *